United States Patent
Lee et al.

(10) Patent No.: US 7,206,154 B2
(45) Date of Patent: Apr. 17, 2007

(54) METHOD AND APPARATUS FOR BALANCED SHIELD SHUNTS, LEADS AND PADS FOR ELECTRICAL NOISE REDUCTION IN READ HEADS

(75) Inventors: Edward Hin Pong Lee, San Jose, CA (US); Robert Langland Smith, Sunnyvale, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 160 days.

(21) Appl. No.: 10/254,285

(22) Filed: Sep. 25, 2002

(65) Prior Publication Data

US 2004/0057146 A1 Mar. 25, 2004

(51) Int. Cl.
 G11B 5/02 (2006.01)
 G11B 5/09 (2006.01)
 G11B 5/48 (2006.01)
 G11B 21/16 (2006.01)

(52) U.S. Cl. .......................... 360/67; 360/46; 360/246

(58) Field of Classification Search ................. 360/31, 360/46, 240, 246
 See application file for complete search history.

(56) References Cited

U.S. PATENT DOCUMENTS

| | | | |
|---|---|---|---|
| 4,971,065 A * | 11/1990 | Pearce | 600/534 |
| 5,296,980 A * | 3/1994 | Matsui et al. | 360/97.01 |
| 5,508,614 A | 4/1996 | Garfunkel et al. | |
| 5,805,382 A * | 9/1998 | Lee et al. | 360/244.1 |
| 6,046,876 A * | 4/2000 | Osafune et al. | 360/67 |
| 6,088,235 A | 7/2000 | Chiao et al. | |
| 6,324,036 B1 | 11/2001 | Dill, Jr. et al. | |
| 6,687,074 B2 * | 2/2004 | Takahashi | 360/67 |

* cited by examiner

*Primary Examiner*—William Korzuch
*Assistant Examiner*—Daniell L. Negrón
(74) *Attorney, Agent, or Firm*—David W. Lynch; Chambliss, Bahner & Stophel P.C.

(57) ABSTRACT

A symmetrical read element circuit for reducing electrical and magnetic noise using signal processing, such as a differential preamplifier. The circuits are symmetrically created on both sides of the read element so that the noise is balanced on both leads of the sensor element allowing substantial noise reduction by the signal processing. That is, the present invention provides symmetrical leads and pads designed for equal noise pickup, and for cancellation of the balanced noise.

25 Claims, 9 Drawing Sheets

METHOD AND APPARATUS FOR BALANCED SHIELD SHUNTS, LEADS AND PADS FOR ELECTRICAL NOISE REDUCTION IN READ HEADS

BACKGROUND OF THE INVENTION

1. Field of the Invention

This invention relates in general to magnetic transducers, and more particularly to a method and apparatus for forming a symmetrical sensor structure for reducing electrical and magnetic noise.

2. Description of Related Art

Magnetic recording is a key and invaluable segment of the information-processing industry. While the basic principles are one hundred years old for early tape devices, and over forty years old for magnetic hard disk drives, an influx of technical innovations continues to extend the storage capacity and performance of magnetic recording products.

In the case of the magnetic hard disk drives, the areal density or density of written data bits on the magnetic medium has increased by a factor of more than two million since the first disk drive was applied to data storage. Since 1991, areal density has grown by the well-known 60% compound growth rate, and this is based on corresponding improvements in heads, media, drive electronics, and mechanics.

Magnetic recording heads have been considered the most significant factor in areal-density growth. The ability of these components to both write and subsequently read magnetically recorded data from the medium at data densities well into the Gbits/in$^2$ range gives hard disk drives the power to remain the dominant storage device for many years to come.

Important features of the disk drives include a rotating magnetic disk, write and read heads that are mounted on a slider having an air-bearing surface (ABS), and a suspension arm for suspending the slider above the rotating disk. The read and write heads are connected to processing circuitry that implements the writing and reading functions.

In operation, an actuator swings the suspension arm to position the read and write heads over selected circular tracks on the rotating disk. The suspension arm biases the slider into contact with the surface of the disk when the disk is not rotating but, when the disk rotates, air is swirled by the rotating disk adjacent the air bearing surface (ABS) of the slider causing the slider to ride on an air bearing a slight distance from the surface of the rotating disk.

Prior to 1991, magnetic heads were designed with a single inductive sensor for performing both reading and writing functions. However, the decreasing signal amplitude resulting from higher areal densities (e.g., 500 Mbits/in$^2$ or greater) promoted the development of magnetoresistive (MR) and giant-magnetoresistive (GMR) read sensors combined with an inductive head. The inductive head thereafter typically performed the write function. Accordingly, the read sensor was designed with narrower gaps and pole geometries to accommodate write track widths that are typically wider than the corresponding read widths. Hence, the read sensor could remain entirely over a written track resulting in a higher signal to noise ratio.

However, with higher data densities, pole edge effects become more significant. As higher density recording media is used, the MR head is built smaller to be capable of reading the high-density recording media. As the MR head is reduced in size, small transient currents due to electrostatic discharge (ESD) are generated and can cause damage to the read sensors.

To prevent damage from the electrostatic discharge, electrical shield shunts are used to protect read sensors. Shield shunts for ESD protection are essentially purposeful shield shorts. These high resistance shield shunts allow accumulated charges to be slowly dissipated. Experimentally, the shield shunts have resulted in yield improvements during fabrication of the sensors.

Unfortunately, shield shunts will also couple unwanted electrical and magnetic noise from outside the file, passing the noise into the file through the shield shunts to the read sensor. The sensor typically picks up this noise; coupling it more to one sensor lead than to the other in the file. This unbalanced noise is difficult to eliminate and results in unwanted electrical and magnetic noise.

It can be seen then that there is a need to improve magnetic and electrical noise cancellation in read heads.

SUMMARY OF THE INVENTION

To overcome the limitations in the prior art described above, and to overcome other limitations that will become apparent upon reading and understanding the present specification, the present invention discloses a method and apparatus for forming a symmetrical sensor structure for reducing electrical and magnetic noise.

The present invention solves the above-described problems by creating symmetrical characteristics on both sides of a sensor element so that noise coupled onto the sensor leads and/or pads may be balanced allowing substantial noise reduction by signal processing, such as may be provided by differential preamplification. That is, the present invention provides symmetrical characteristics for leads and/or pads about a sensor element. The symmetrical characteristics for leads and/or pads are designed for equal noise pickup and for cancellation of the balanced noise. Herein, symmetrical refers to a design wherein the noise contributions therefrom is balanced on both sides of an axis about a sensor element. However, the term symmetrical, as used herein, is not meant to be limited to a mirrored design. In addition, the term characteristics, as used herein, is meant to include area, volume, length, width, height, layout, thickness, material and fabrication processes of leads, pads and/or other sensor element components.

A method in accordance with the principles of the present invention includes providing a first sensor circuit with a first predetermined structure having a first noise contribution, and providing a second sensor circuit with a second predetermined structure having a second noise contribution, wherein characteristics of the first and second sensor structures are chosen to balance the first and second noise contributions.

In another embodiment of the present invention, a read channel is described. The read channel includes a first sensor circuit with a first predetermined structure having a first noise contribution, and a second sensor circuit with a second predetermined structure having a second noise contribution, wherein characteristics of the first and second sensor structures are chosen to balance the first and second noise contributions.

In another embodiment of the present invention, a magnetic storage device is described. The magnetic storage device includes a magnetic media for storing data thereon, a motor for translating the position of the magnetic media, and an actuator for positioning a read element, wherein the read element includes a first sensor circuit with a first predetermined structure having a first noise contribution, and a second sensor circuit with a second predetermined structure having a second noise contribution, wherein characteristics of the first and second sensor structures are chosen to balance the first and second noise contributions therefrom.

In yet another embodiment of the present invention, a means for noise reduction in a read sensor element is described. The means for noise reduction including a first sensor means having a first noise contribution, and a second sensor means having a second noise contribution, wherein characteristics of the first and second sensor means are chosen to balance the first and second noise contributions.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings, which form a part hereof, and in which is shown by way of illustration the specific embodiment in which the invention may be practiced. It is to be understood that other embodiments may be utilized as structural changes may be made without departing from the scope of the present invention.

The present invention discloses a method and apparatus for forming a symmetrical sensor structure that balances electrical and magnetic noise. The symmetrical sensor structure includes both leads and pads on both sides of the read element so that the noise is balanced on both leads of the read sensor. This noise may be picked up equally from shields, substrate and disks. Further, the symmetrical design creates symmetrical capacitance, resistance and inductance on both sides of the read sensor balancing the noise contribution from the leads.

Signal processing, such as a differential preamplifier, may then be used to eliminate the balanced noise. The invention may be used with or without shield shunts to improve noise reduction. Herein, symmetrical refers to a design wherein the noise contributions therefrom is balanced on both sides of an axis about a sensor element. However, the term symmetrical, as used herein, is not meant to be limited to a mirrored design. In addition, the term characteristics, as used herein, is meant to include area, volume, length, width, height, layout, thickness, material and fabrication processes of leads, pads and/or other sensor element components.

Figure 1:
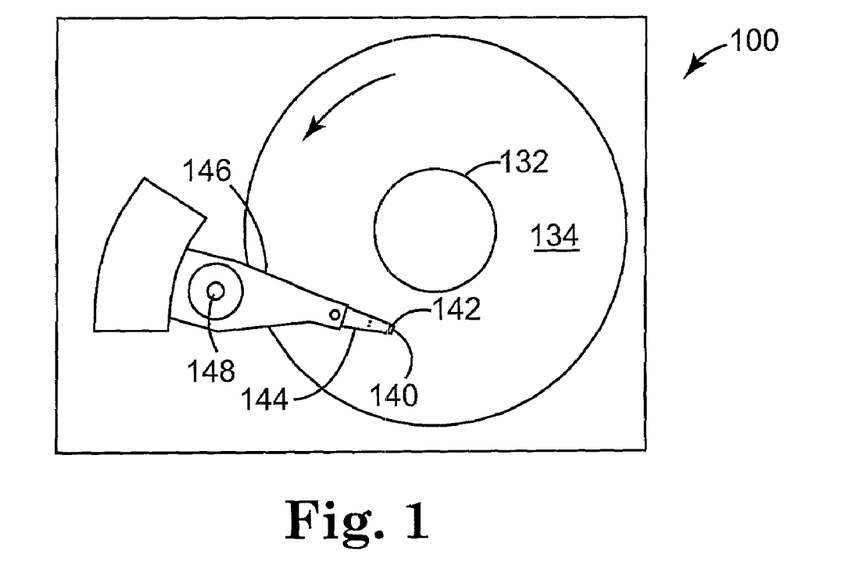
FIG. 1 illustrates a storage system according to the present invention.

FIG. 1 illustrates a storage system 100 according to the present invention. In FIG. 1, a transducer 140 is under control of an actuator 148. The actuator 148 controls the position of the transducer 140. The transducer 140 writes and reads data on magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 2:
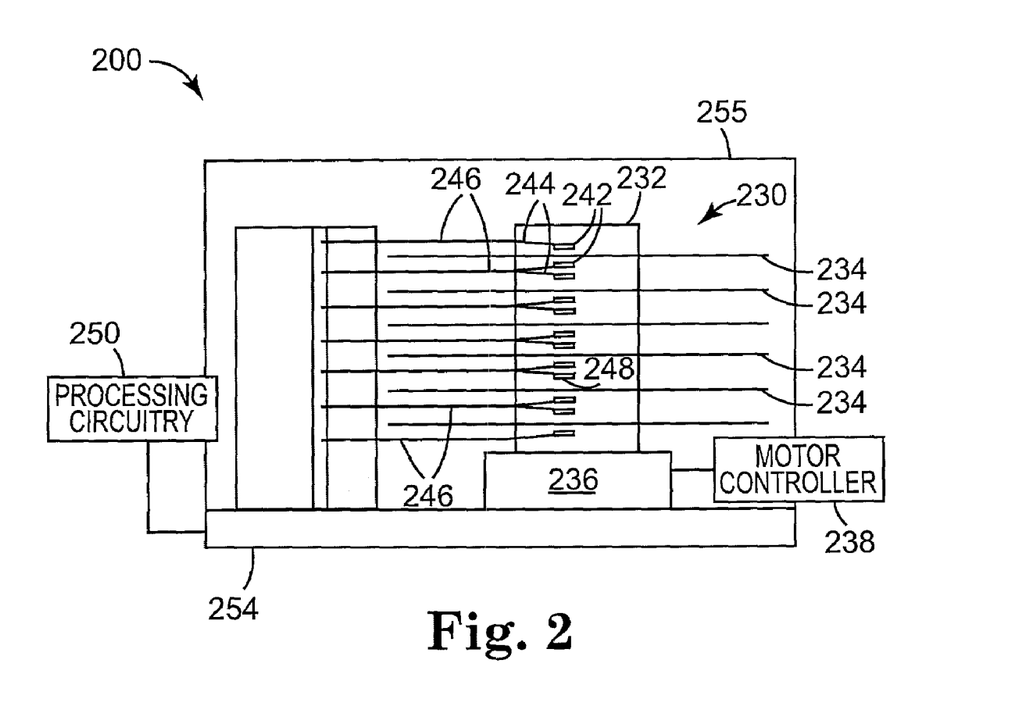
FIG. 2 illustrates one particular embodiment of a storage system according to the present invention.

FIG. 2 illustrates one particular embodiment of a storage system 200 according to the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234 the slider 242 is supported on a thin cushion of air (air bearing) between the surface of the disk 234 and the air-bearing surface (ABS) 248. The magnetic head may then be employed for writing information to multiple circular tracks on the surface of the disk 234, as well as for reading information therefrom.

Figure 3:
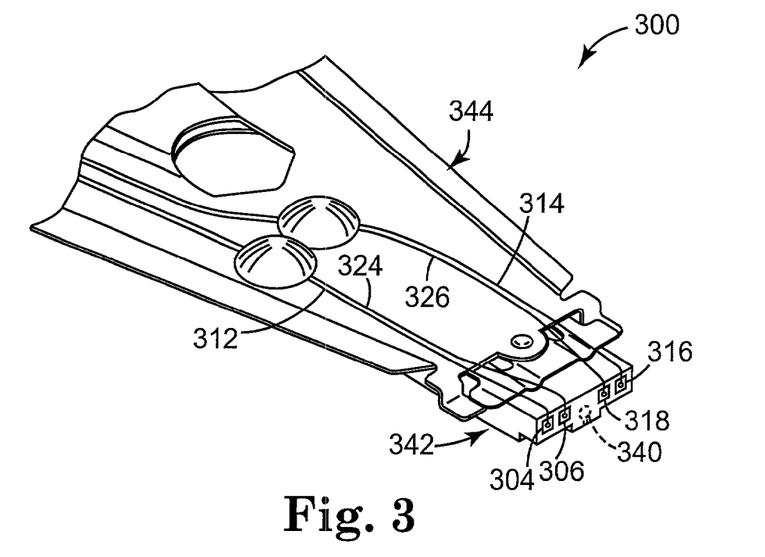
FIG. 3 is an isometric illustrates of a suspension system for supporting a slider and a magnetic head.

FIG. 3 is an isometric illustrates of a suspension system 300 for supporting a slider 342 having a magnetic head mounted thereto. In FIG. 3 first and second solder connections 304 and 306 connect leads from the sensor 340 to leads 312 and 324 on the suspension 344 and third and fourth solder connections 316 and 318 connect the coil to leads 314 and 326 on the suspension 344. However, the particular locations of connections may vary depending on head design.

Figure 4:
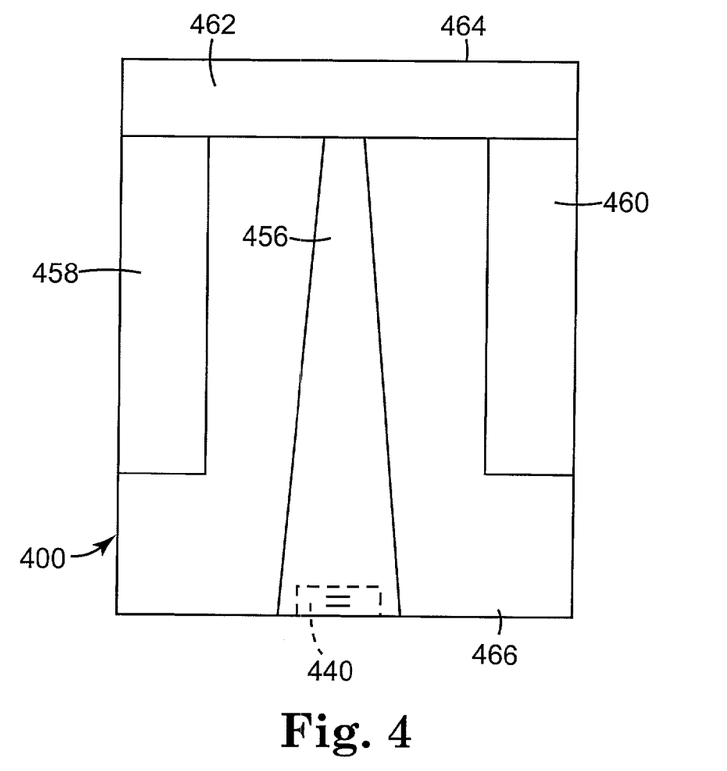
FIG. 4 is an ABS view of the slider and the magnetic head.

FIG. 4 is an ABS view of the slider and the magnetic head 400. The slider has a center rail 456 that supports the magnetic head 440, and side rails 458 and 460. The rails 456, 458 and 460 extend from a cross rail 462. With respect to rotation of a magnetic disk, the cross rail 462 is at a leading edge 464 of the slider and the magnetic head 440 is at a trailing edge 466 of the slider.

Figure 5:
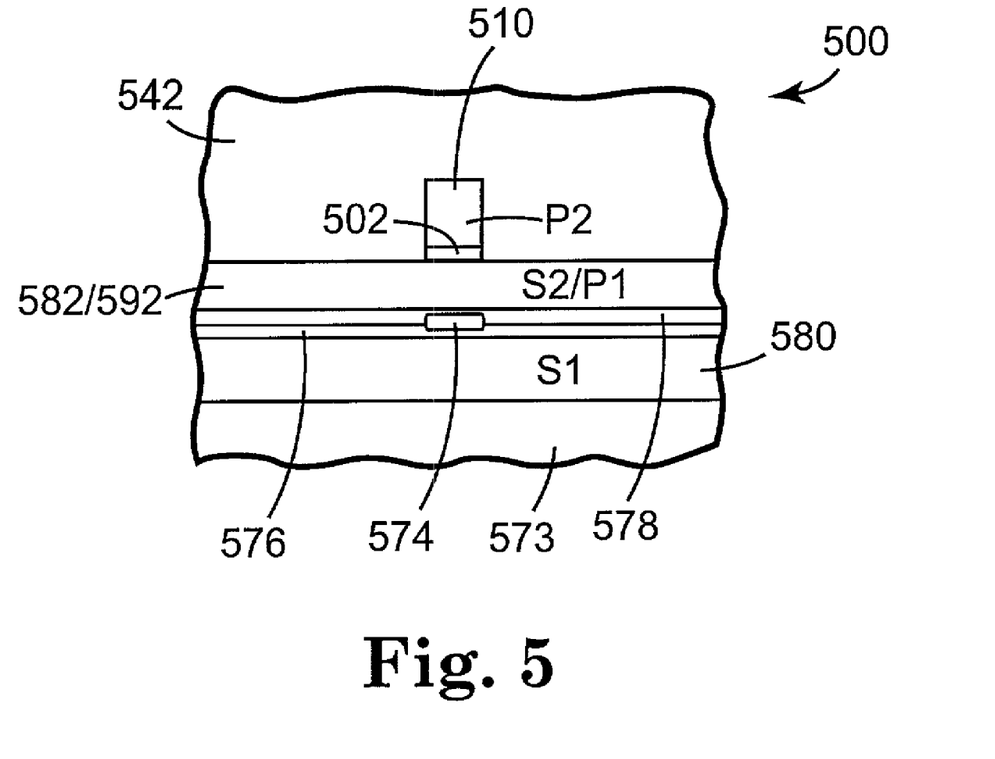
FIG. 5 is an enlarged partial ABS view of the slider to show the read and writer elements of a magnetic head.

FIG. 5 is an enlarged partial ABS view 500 of the slider 542 to show the read and writer elements of a magnetic head.

The read sensor 574 is located between first and second gap layers 576 and 578 and the gap layers are located between first shield layer (S1) 580 and second shield layer (S2) 582. A first pole piece layer (not shown) and second pole piece layer (not shown) are magnetically coupled at a back gap (not shown) and have first pole tip (P1) 592 and second pole tip (P2) 510 which are separated by a write gap layer 502 at the ABS. In response to external magnetic fields, the resistance of the sensor 574 changes. A sense current $I_S$ conducted through the read sensor 574 causes these resistance changes to be manifested as potential changes. These potential changes are then processed as readback signals by the processing circuitry 250 shown in FIG. 2. The shielding layers 580 and 582 typically comprise a soft ferromagnetic material such as sendust or NiFe, and are formed by conventional methods such as chemical vapor deposition (CVD) or sputtering or plating. Shield layer 580 is formed on a substrate, being separated by an undercoat 573. The gap layers 576 and 578 comprise any material suitable for electrically isolating the conductive layers of the read element, e.g., $Al_2O_3$, $SiO_2$, etc.

Figure 6A:
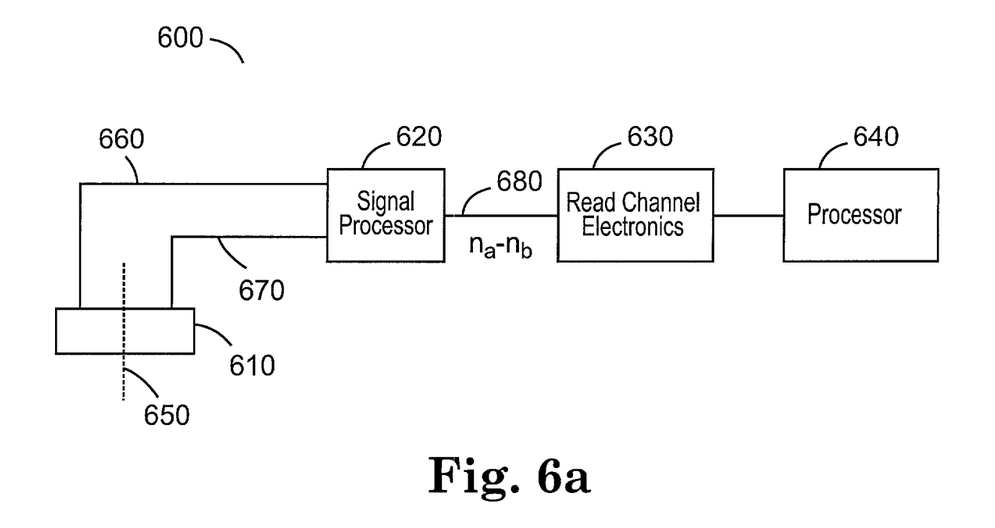
FIGS. 6a–b illustrate noise reduction systems according to the present invention.
Figure 6B:
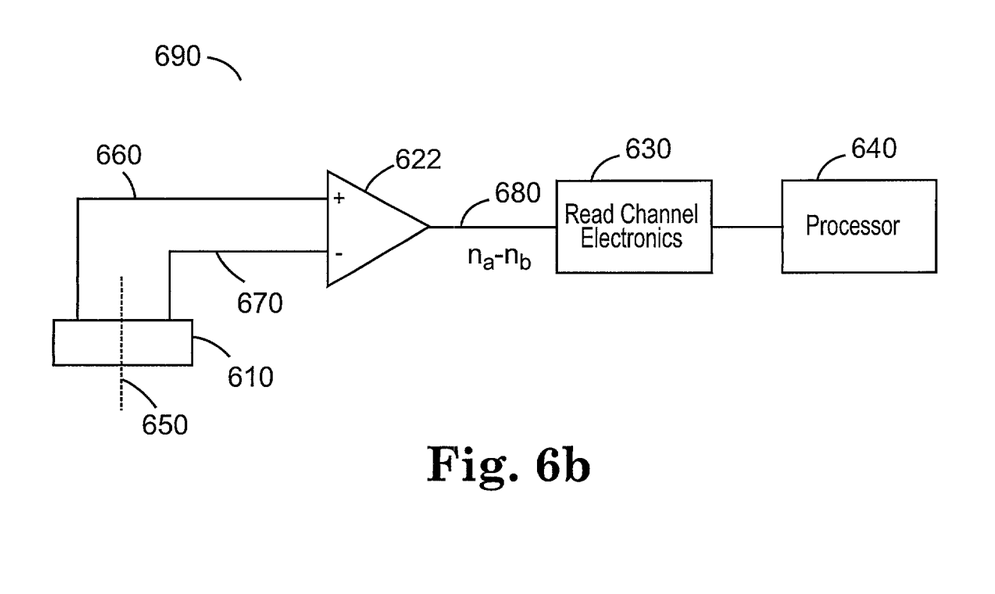

FIGS. 6a–b illustrate noise reduction systems 600, 690 according to the present invention. In FIG. 6a, a thin film MR head, for example, employs a magnetoresistive (MR) sensor 610 for reading information signals from a moving magnetic medium (not shown), such as a rotating magnetic disk. First and second leads 660, 670 are employed for connecting the MR sensor 610 to a first and second read pad (not shown). A sense current is applied to the MR sensor 610 via the read pads. Magnetic fields from the magnetic medium cause resistance changes in the MR sensor 610. The resistance changes cause potential changes across the read pads, which are sensed by a detector or signal processor 620 (such as a differential amplifier 622 of FIG. 6b). The output of the detector is the readback signal 680.

The read sensor 610, including the read pads (not shown) and leads 660, 670, has a symmetrical structure about an axis 650. The read sensor 610 is coupled to the signal processor 620 via symmetrical leads 660, 670. The signal processor 620 substantially reduces noise to the read sensor 650 from the shields, substrate and disk (not shown). The resulting readback signal 680 is further processed by read channel electronics 630 and/or a processor 640.

FIG. 6b shows the signal processor being a differential amplifier. However, the present invention is not meant to be limited to the noise reduction system 690 having a differential amplifier 622. Rather, the noise reduction system 690 is merely one particular embodiment of the present invention, which is more generally represented by noise reduction system 600 that includes signal processor 620.

Figure 7:
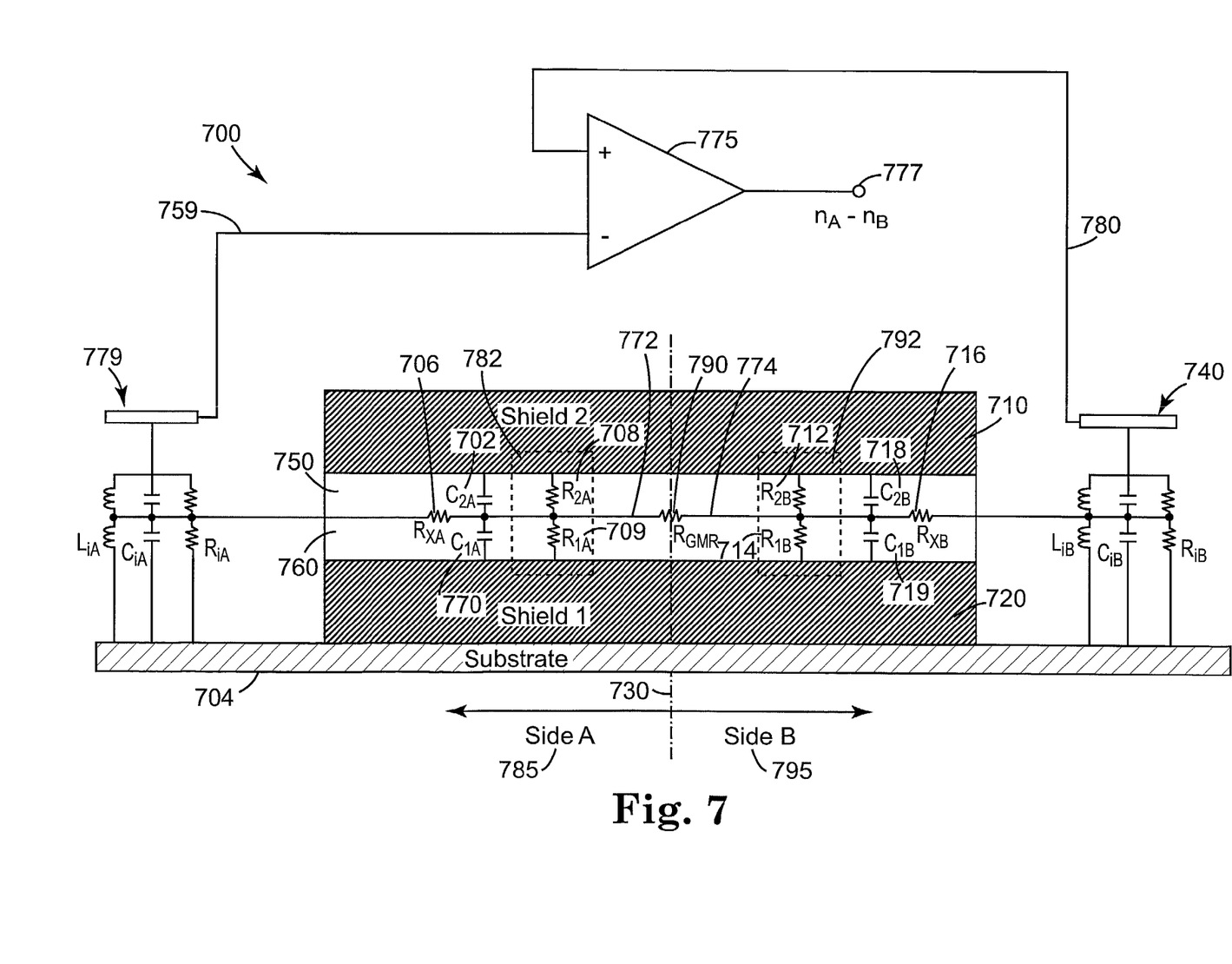
FIG. 7 is a cross-sectional view of a read element layer having associated electrical parameters according to the present invention.

FIG. 7 is a cross-sectional view of the read element 700 and the read element's associated electrical parameters according to the present invention. FIG. 7 illustrates a symmetrical design for the read element 700 about an axis of symmetry 730. Herein, symmetrical refers to a design wherein the design is balanced on both sides of an axis about a sensor element, but not necessarily a mirror image. For example, the symmetrical design creates symmetrical characteristics such as capacitances (C), resistances (R) and inductance (L) on both A 785 and B 795 sides. A mirror image of resistance, capacitance and inductance around the axis 730 is one way to balance electromagnetic, RF or magnetic noise. However, the present invention is not limited to these characteristics for reducing noise. For example, the present invention may use characteristics such as symmetrical shield shunts 782, 792 to the leads 772, 774 on both sides of the GMR sensor 790 so that the noise is balanced on both leads 772, 774 of the GMR sensor 790 to improve the reduction of the noise by the differential preamplification 775. That is, the noise signals of leads 772, 774 are balanced and thus the noise can be substantially eliminated by the differential preamplifier 775, wherein the balanced noise signals on leads 772, 774 are subtracted.

Also, the present invention can be used with or without shield shunts 782, 792 to improve noise reduction. For example, by making the head-substrate-to-pad-A 779 coupling equal to that of pad B 740, noise coupled from the substrate 704 will be balanced and substantially reduced by the differential preamplifier 775 as discussed above.

The characteristics of the leads 772, 774 and pads 779, 740, according to the present invention, provides for equal noise pickup on pad A 779 and pad B 740 for subtraction by the differential preamplifier 775. For example, this can be done with a symmetrical lead and pad design (as shown below with FIGS. 8b–d) for symmetrical noise pickup to the read sensor from shields 710, 720, substrate 704 and disk (not shown).

Read element parameters R 708, 709, 712, 714, 706, 716, and C 702, 770, 718, 719 are located in a first gap layer 760 and second gap layer 750, the first and second gap layers 760, 750 being disposed between a first shield layer 720 and a second shield layer 710. These electrical parameters should be made as symmetrical as possible for optimal reduction of noise. That is, for side A 785 and side B 795, $R_{1A}=R_{1B}$, $R_{2A}=R_{2B}$, $R_{XA}=R_{XB}$, $C_{1A}=C_{1B}$, and $C_{2A}=C_{2B}$.

Further, elements $R_{1A}$ 709, $R_{2A}$ 708, $R_{1B}$ 714, and $R_{2B}$ 712 are selected to provide adequate ESD protection without sacrificing read signal by shunting bias current. That is, the resistance of elements $R_{1A}$ 709, $R_{2A}$ 708, $R_{1B}$ 714, and $R_{2B}$ 712 are not selected to be too small as to create a short (good ESD protection), and not selected to be too large as to eliminate shunting bias current (no ESD protection). Optionally, $C_{1A}$ 770, $C_{2A}$ 702, $C_{1B}$ 719, and $C_{2B}$ 718 may be minimized to reduce noise.

Also, for optimal noise cancellation during differential preamplification 775, balanced resistance $R_{iA}$, $R_{iB}$, inductance $L_{iA}$, $L_{iB}$, and capacitive coupling $C_{iA}$, $C_{iB}$ on both pad A 779 and pad B 740, respectively, should be symmetrical. Thus, noise directed via pad A lead 759 and pad B lead 780 is reduced by differential preamplification 775 as measured at the output 777 of the differential preamplifier 775.

Figures 8A, 8B, 8C:
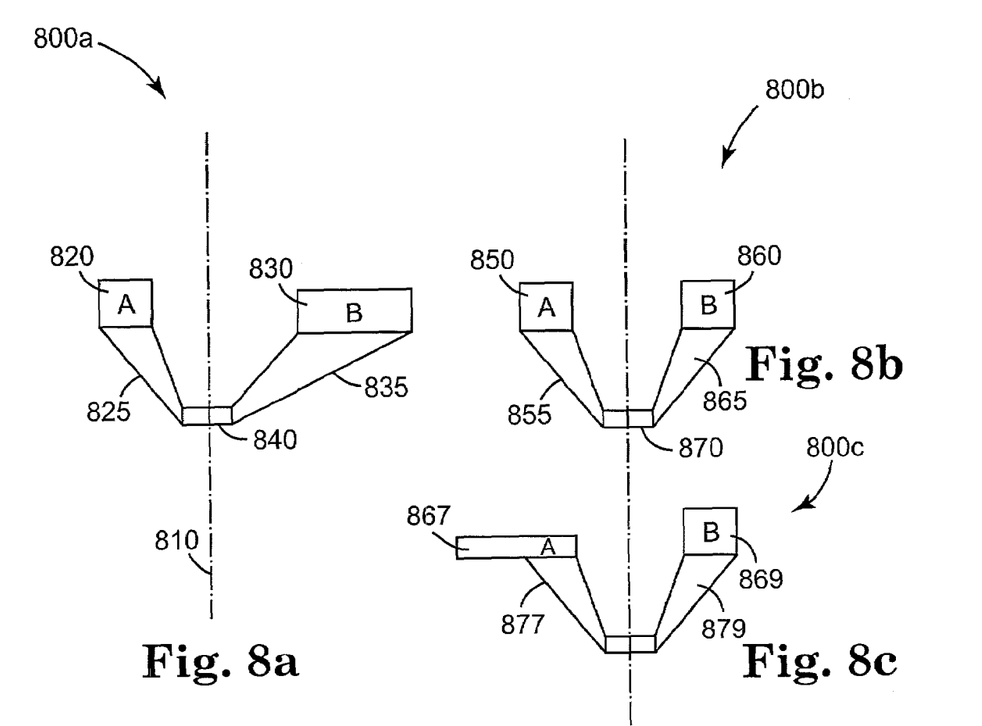
FIG. 8a illustrates a prior art design of unbalanced pads and leads.
FIGS. 8b–d illustrate a balanced design of pads and leads according to the present invention.

FIG. 8a illustrates a prior art design 800a of unbalanced pads and leads. The characteristics of pad A 820 and lead A 825 are not symmetrical with the characteristics of pad B 830 and lead B 835 about the axis of symmetry 810 of the read element 840. This unbalanced design 800a creates noise on pad A 820 that is not equal to the noise on pad B 830, and thus the noise will not be cancelled by the differential amplifier (not shown in FIG. 8a).

Figure 8D:
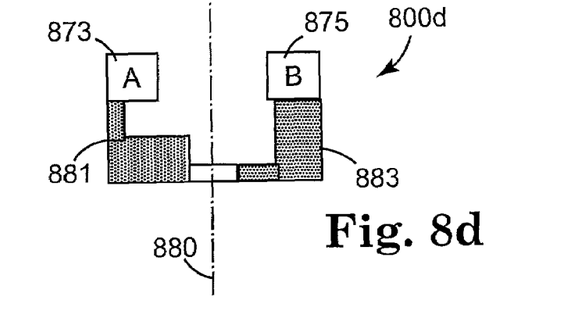

FIGS. 8b–d illustrate balanced designs 800b–d of pads and leads according to the present invention. The balanced designs characteristics of FIG. 800b substantially reduces noise by providing, for example, symmetrical leads 855, 865 and pads 850, 860 that pickup noise from at least shields, substrate and disks, which may be transferred to the read element 870. That is, the design characteristics in FIG. 800b are a mirror image about the axis of symmetry 880 of the read element 870. Pads 850 and 860 are substantially the same as pads 779 and 740 in FIG. 7. Leads 855 and 865 are substantially the same as leads 772 and 774 in FIG. 7.

Design characteristics of 800c–d are similar to design characteristics of 800b in that symmetry is provided about the read sensor's axis 880. However, mirror image design characteristics are not required. For example, other characteristics may be included in a symmetrical design including area, volume, length, width, height, layout, thickness, material and fabrication process of leads, pads and other sensor element components. For example, consider designs 800c and 800d. In design 800c, the area of pad A 867 is substantially similar to the area of pad B 869.

Also, the area of lead A 877 is substantially similar to the area of lead B 879. In design 800d, the area of pad A 873 is substantially similar to pad B 875. Also, the area of lead A 881 is substantially similar to the area of lead B 883. Thus, the balanced designs 800b–d of the present invention makes the noise on pad A equal to the noise on pad B so that the noise of pad A and pad B are cancelled by the differential amplifier.

Figure 9:
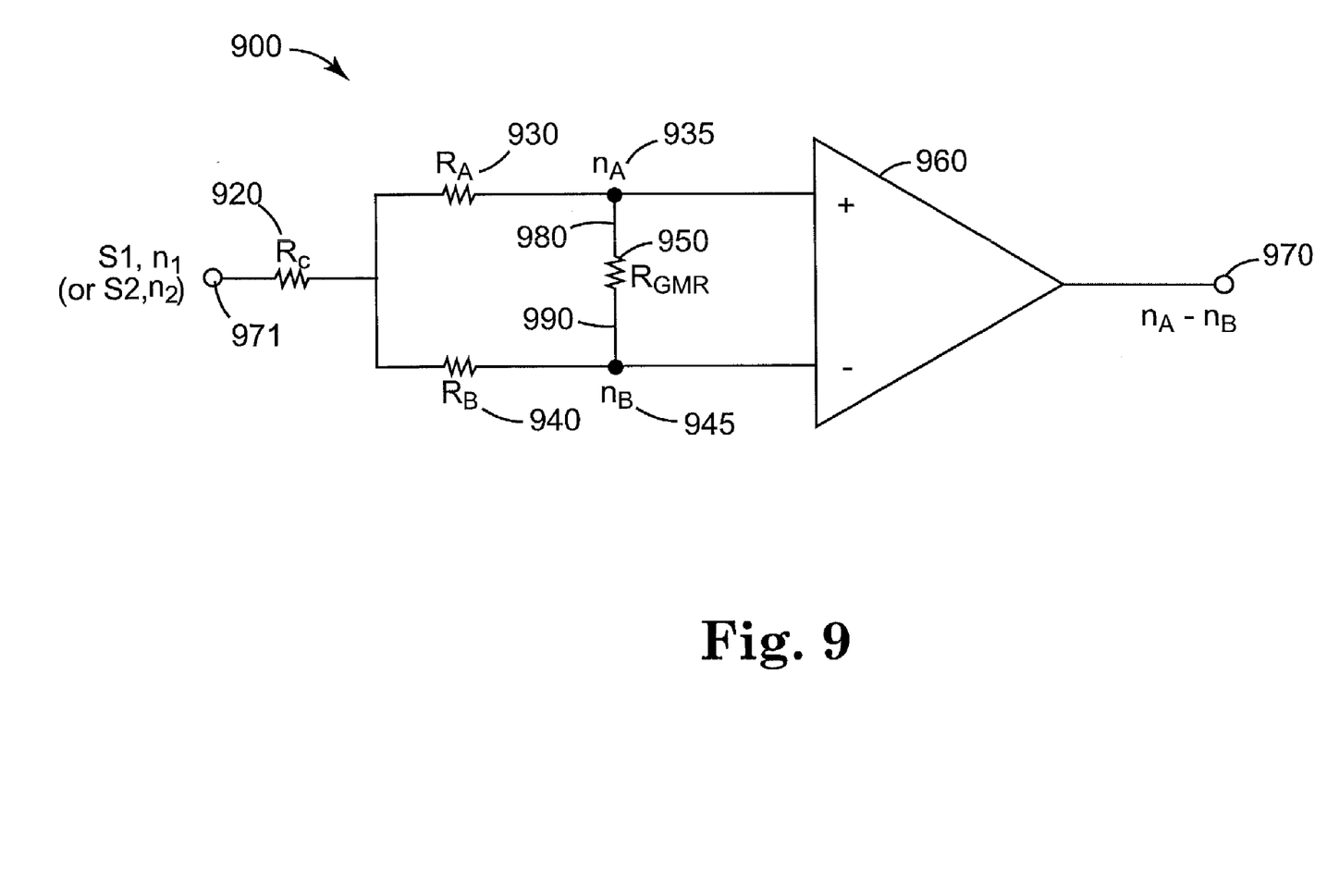
FIG. 9 is one embodiment of a read sensor circuit illustrating noise cancellation according to the present invention.

FIG. 9 is one embodiment of a read sensor circuit 900 illustrating noise reduction according to the present invention. The circuit in FIG. 9 provides ESD protection using at least shield shunt resistors $R_C$ 920, $R_A$ 930, and $R_B$ 940 (refer to FIG. 11 for $R_A$, $R_B$ and $R_C$). Accordingly, $R_A$ equals $R_B$ and both are symmetrical about the read sensor 950 so that the same amount of electrical noise at shield 1 ($n_1$, FIG. 11—1110) or at shield 2 ($n_2$, FIG. 11—1120), which is realized at the input 971 of the circuit 900, is inserted into the leads 980, 990 at $n_A$ 935 and $n_B$ 945, respectively, and cancelled at the output 970 of the differential preamplifier 960, i.e., $n_A - n_B = 0$.

Figure 10:
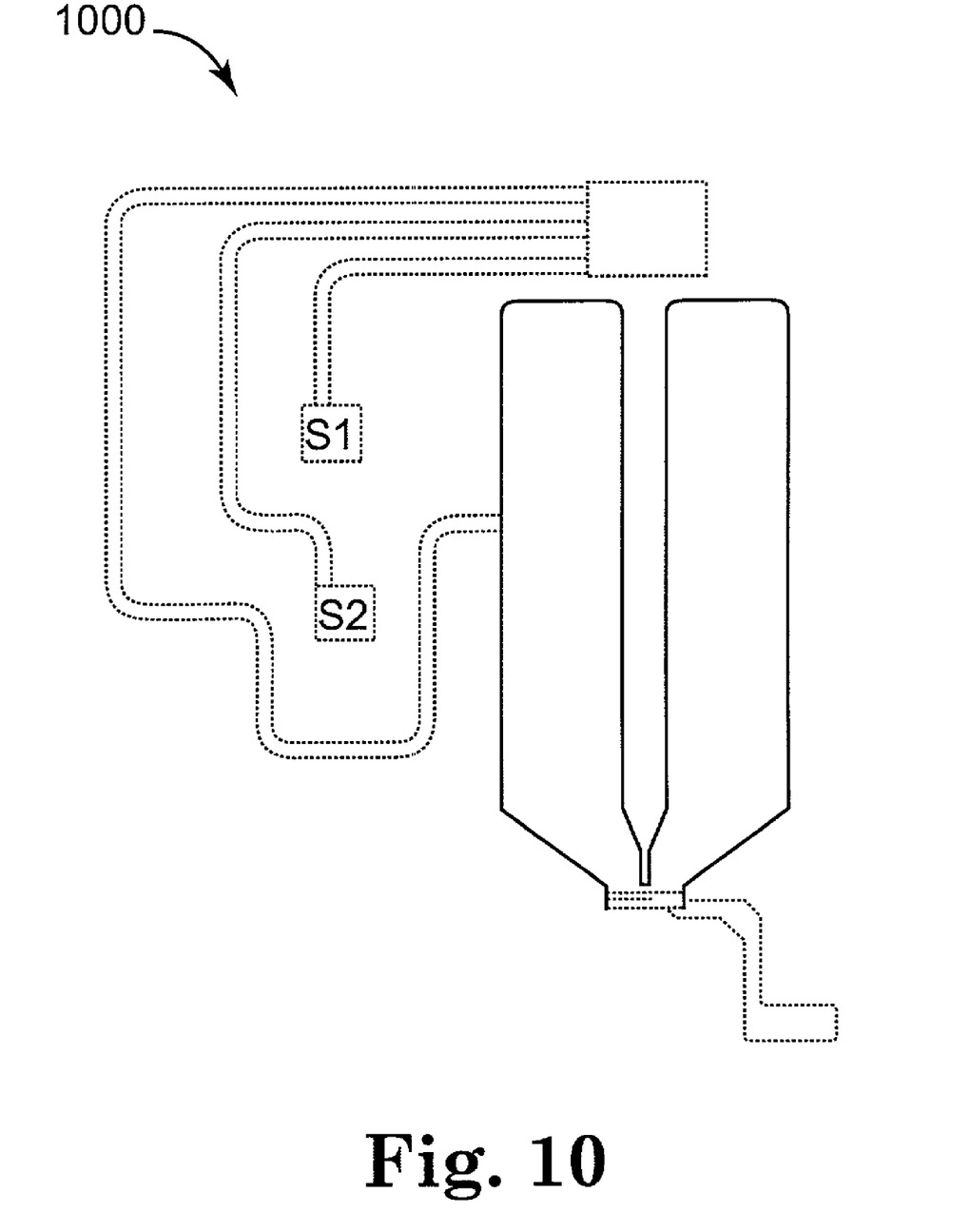
FIG. 10 is a diagram of prior art single sided shield shunts connected to one of the leads to the read head.

FIG. 10 is a diagram 1000 of prior art single sided shield shunts connected to the leads of the read element. In contrast to the present invention, the prior art does not use symmetrical design characteristics. Thus, the prior art design is inferior to the present invention because, for example, noise coupling through unbalanced shield shunts is accomplished by decreasing the resistance of the shunts, and thereby, as discussed above, a larger resistance eliminates the shunting bias current and sacrifices ESD protection (via the shield shunts). Also, the prior art uses single ended preamplifiers with shield shunts, which sacrifices using a differential preamplifier for noise cancellation.

Figure 11:
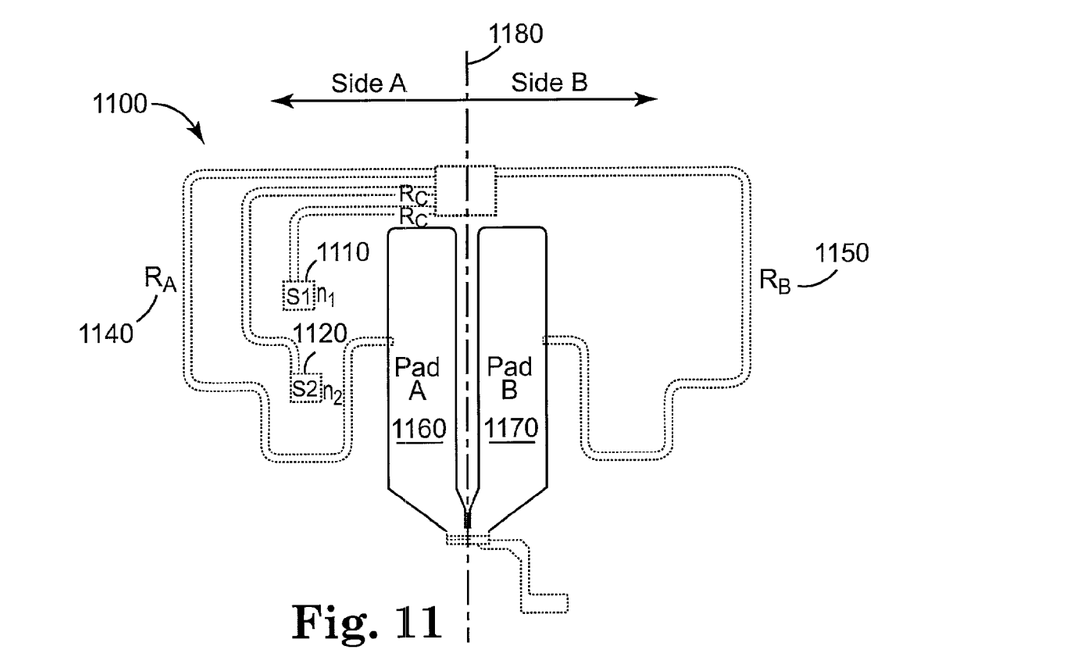
FIGS. 11 and 12 illustrate symmetrical sensor circuits according to the present invention.
Figure 12:
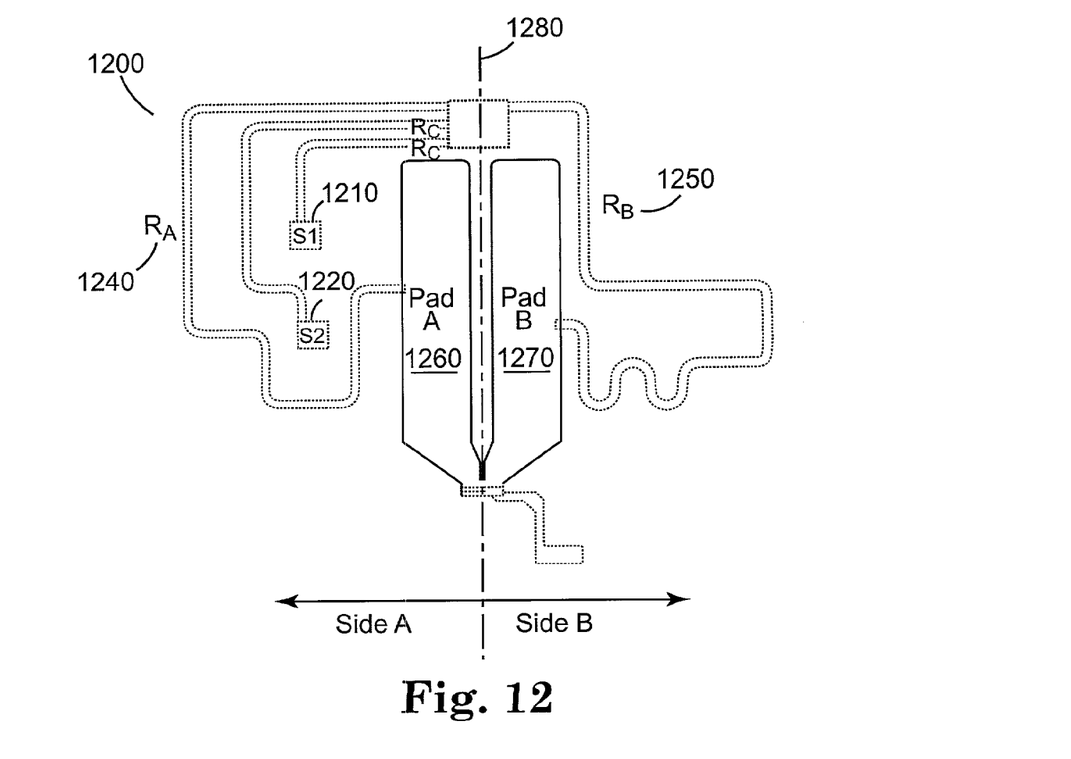

FIGS. 11 and 12 illustrates symmetrical sensor circuits 1100, 1200 according to the present invention. FIGS. 11 and 12 illustrate symmetrical layouts characteristics of a read sensor structures about an axis of symmetry 1180, 1280. FIG. 11 illustrates a mirrored symmetrical design characteristics wherein lead A 1160 and lead B 1170 are symmetrical about the axis of symmetry 1180 and a substantially same amount of electrical noise at shield 1 (1110) or shield 2 (1120) is inserted into shield shunts $R_A$ 1140 and $R_B$ 1150 equally. FIG. 8b illustrates a mirror image of leads A 1160 and B 1170 (wherein leads 855 and 865 correspond to leads 1160 and 1170 respectively). Also, the design shows that the shield shunt $R_A$ 1140 is a mirror image of shield shunt $R_B$ 1150. The symmetrical design allows for subtraction of noise on shield shunts 1140, 1150 and leads 1160, 1170. FIGS. 10–12 omit pads 779 and 740 as shown in FIG. 7. Lead 1160 is substantially the same as lead 772 in FIG. 7 and lead 1170 is substantially the same as lead 774 in FIG. 7.

FIG. 12 illustrates a non-mirrored symmetrical design characteristics wherein lead A 1260 and lead B 1270 are symmetrical about the axis of symmetry 1280, and thus, a substantially same amount of electrical noise at shield 1 (1210) or shield 2 (1220) is inserted into shield shunts $R_A$ 1240 and $R_B$ 1250 equally. Also, the design shows that the pad lead $R_A$ 1240 is substantially symmetrical with pad lead $R_B$ 1250. That is, the area of the lead elements, $R_A$ 1240, $R_B$ 1250, is substantially equal.

In summary, the present invention discloses a method and apparatus for forming a first and second sensor structure, each structure having a noise contribution. The characteristics of the first and second sensor structure are chosen to be symmetrical about the axis of symmetry of the read sensor to balance electrical and magnetic noise on the sensor leads and pads of the each sensor structure. This noise may be picked up equally from shields, substrate and disks. Then, the balanced noise may be substantial eliminated by canceling the balanced noise signals from the two leads.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for reducing noise in a differential output signal of a magnetic head, comprising:

providing a sensor element within a magnetic head for detecting a magnetically recorded signal and producing a differential read signal in response thereto;

providing within the magnetic head a first sensor element signal path having a first physical structure selected to provide first electrical characteristics including a first noise signal component of the read signal on the first sensor element signal path at a first head output terminal; and providing within the magnetic head a second sensor element signal path having a second physical structure selected to provide second electrical characteristics including a second noise signal component of the read signal on the second sensor element signal path at a second head output terminal; and wherein design characteristics of the first and second physical structures are selected to be symmetrical for equalizing the first and second electrical characteristics thereby allowing the output signal of the magnetic head from the first and second physical structures to be differentially processed to cancel the first noise signal component with the second noise signal component.

2. The method of claim 1 further comprising processing the balanced first and second noise signal components to eliminate the first and second noise signal components.

3. The method of claim 1 further comprising providing a differential amplifier wherein the first and second noise signal components are cancelled by the differential amplifier.

4. The method of claim 3, wherein the processing the first and second noise signal components further comprises differentially preamplifying signals from the first and second sensor signal paths to eliminate the first and second noise signal components thereof.

5. The method of claim 1, wherein the providing a first sensor element signal path within the magnetic head further comprising providing a first lead and a first pad and wherein the providing a second sensor element signal path within the magnetic head further comprises providing a second lead and a second pad, wherein design characteristics of the first pad is symmetrical with design characteristics of the second pad and design characteristics of the the first lead is symmetrical with design characteristics of the second lead.

6. The method of claim 5, wherein the providing a first lead and a first pad and the providing a second lead and a second pad further comprises creating symmetrical capacitances, resistances and inductances in the first and second pads.

7. The method of claim 1 further comprising providing a first shield shunt and a second shield shunt, wherein the design characteristics of the first shield shunt is symmetrical with the design characteristics of the second shield shunt.

8. The method of claim 1, wherein the providing a first and second noise signal components further comprises providing noise generated from at least a substrate, a shield, and a disk, wherein the first and second sensor element signal paths are formed so that the noise generated from at least the substrate, the shield, and the disk for the first and second sensor element signal paths are balanced.

9. A read channel, comprising:
a sensor element disposed within a magnetic head for detecting a magnetically recorded signal and producing a differential read signal in response thereto;
a first sensor element signal path formed within the magnetic head, the first sensor element signal path having a first physical structure selected to provide first electrical characteristics including a first noise signal component of the read signal on the first sensor element signal path at a first head output terminal; and
a second sensor element signal path formed within the magnetic head, the second sensor element signal path having a second physical structure selected to provide second electrical characteristics including a second noise signal component of the read signal on the second sensor element signal path at a second head output terminal;
wherein design characteristics of the first and second physical structures are selected to be symmetrical for equalizing the first and second electrical characteristics thereby allowing the output signal of the magnetic head from the first and second physical structures to be differentially processed to cancel the first noise signal component with the second noise signal component.

10. The read channel of claim 9 further comprising a signal processor for processing the balanced first and second noise signal components to eliminate the first and second noise contributions.

11. The read channel of claim 10, wherein the signal processor further comprises a differential amplifier wherein the first and second noise signal components are cancelled by the differential amplifier.

12. The read channel of claim 10, wherein the signal processor differentially preamplifies signals from the first and second sensor signal paths to eliminate the first and second noise signal components thereof.

13. The read channel of claim 9, wherein the first sensor element signal path within the magnetic head further comprising a first lead and a first pad and wherein the second sensor element signal path within the magnetic head further comprises a second lead and a second pad, wherein design characteristics of the first pad is symmetrical with design characteristics of the second pad and design characteristics of the the first lead is symmetrical with design characteristics of the second lead.

14. The read channel of claim 13, wherein the first pad and the second pad provide symmetrical capacitances, resistances and inductances.

15. The read channel of claim 9 further comprising a first shield shunt and a second shield shunt, wherein the design characteristics of the first shield shunt is symmetrical with the design characteristics of the second shield shunt.

16. The read channel of claim 15, wherein the noise generated from at least the substrate, the shield, and the disk for the first and second sensor element signal paths are balanced.

17. A magnetic storage device, comprising
magnetic media for storing data thereon;
a motor for translating the position of the magnetic media; and
an actuator for positioning a magnetic head for reading signals from the magnetic media, the magnetic head comprising:
a sensor element disposed within a magnetic head for detecting a magnetically recorded signal and producing a differential read signal in response thereto;
a first sensor element signal path formed within the magnetic head, the first sensor element signal path having a first physical structure selected to provide first electrical characteristics including a first noise signal component of the read signal on the first sensor element signal path at a first head output terminal; and
a second sensor element signal path formed within the magnetic head, the second sensor element signal path having a second physical structure selected to provide second electrical characteristics including a second noise signal component of the read signal on the second sensor element signal path at a second head output terminal;
wherein design characteristics of the first and second physical structures are selected to be symmetrical for equalizing the first and second electrical characteristics thereby allowing the output signal of the magnetic head from the first and second physical structures to be differentially processed to cancel the first noise signal component with the second noise signal component.

18. The magnetic storage device of claim 17 further comprising a signal processor for processing the balanced first and second noise signal componets to eliminate the first and second noise signal componets.

19. The magnetic storage device of claim 18, wherein the signal processor further comprises a differential amplifier wherein the first and second noise signal components are cancelled by the differential amplifier.

20. The magnetic storage device of claim 18, wherein the signal processor differentially preamplifies signals from the first and second sensor signal paths to eliminate the first and second noise signal componets thereof.

21. The magnetic storage device of claim 17, wherein the first sensor element signal path within the magnetic head further comprising a first lead and a first pad and wherein the second sensor element signal path within the magnetic head further comprises a second lead and a second pad, wherein design characteristics of the first pad is symmetrical with design characteristics of the second pad and design characteristics of the the first lead is symmetrical with design characteristics of the second lead.

22. The magnetic storage device of claim 21, wherein the first pad and the second pad provide symmetrical capacitances, resistances and inductances.

23. The magnetic storage device of claim 17 further comprising a first shield shunt and a second shield shunt, wherein the design characteristics of the first shield shunt is symmetrical with the design characteristics of the second shield shunt.

24. The magnetic storage device of claim 23, wherein the noise generated from at least the substrate, the shield, and the disk for the first and second sensor element signal paths are balanced.

25. A read channel, comprising:

means disposed within a magnetic head for detecting a magnetically recorded signal and producing a differential read signal in response thereto;

first means formed within the means for detecting, for providing a first physical structure selected to provide first electrical characteristics including a first noise signal component of the read signal on the first sensor element signal path at a first head output terminal; and second means formed within the means for detecting, for providing a second physical structure selected to provide second electrical characteristics including a second noise signal component of the read signal on the second sensor element signal path at a second head output terminal;

wherein design characteristics of the first and second means for providing physical structures are selected to be symmetrical for equalizing the first and second electrical characteristics thereby allowing the output signal of the means for detecting from the first and second means for providing physical structures to be differentially processed to cancel the first noise signal component with the second noise signal component.

* * * * *

UNITED STATES PATENT AND TRADEMARK OFFICE
CERTIFICATE OF CORRECTION

| | |
|---|---|
| PATENT NO. | : 7,206,154 B2 |
| APPLICATION NO. | : 10/254285 |
| DATED | : April 17, 2007 |
| INVENTOR(S) | : Lee et al. |

It is certified that error appears in the above-identified patent and that said Letters Patent is hereby corrected as shown below:

Col. 8, Line 61: "of the the first" should read -- of the first --
Col. 10, Line 53: "of the the first" should read -- of the first --

Signed and Sealed this

Nineteenth Day of June, 2007

JON W. DUDAS
*Director of the United States Patent and Trademark Office*